No. 751,273. Patented February 2, 1904.

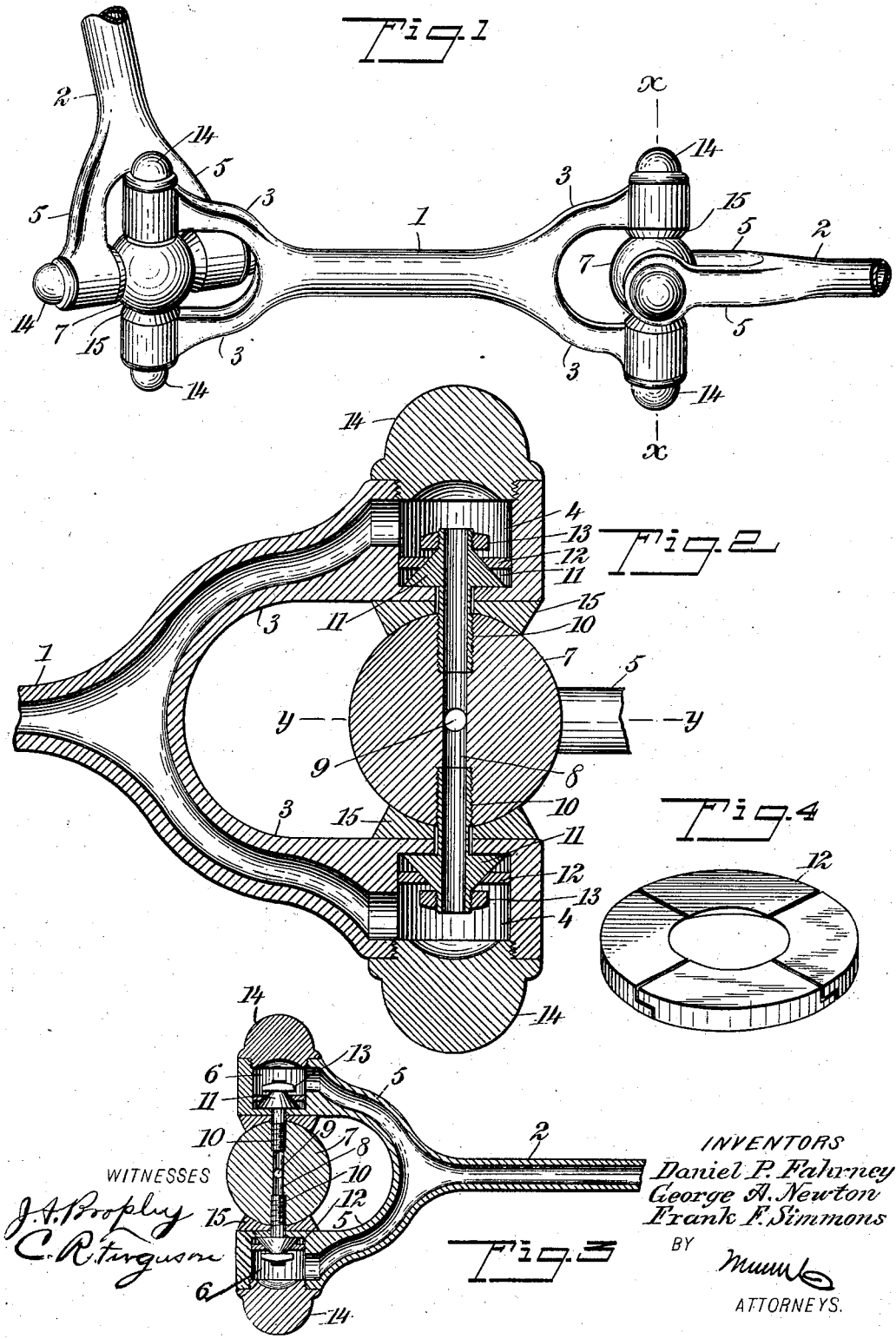

UNITED STATES PATENT OFFICE.

DANIEL P. FAHRNEY, GEORGE A. NEWTON, AND FRANK F. SIMMONS, OF SPRINGFIELD, MISSOURI.

PIPE-JOINT.

SPECIFICATION forming part of Letters Patent No. 751,273, dated February 2, 1904.

Application filed May 13, 1903. Serial No. 156,934. (No model.)

*To all whom it may concern:*

Be it known that we, DANIEL P. FAHRNEY, GEORGE A. NEWTON, and FRANK F. SIMMONS, citizens of the United States, and residents of Springfield, in the county of Greene and State of Missouri, have invented a new and Improved Pipe-Joint, of which the following is a full, clear, and exact description.

This invention relates to improvements in joints for air or steam pipes of car-brake systems or other train-pipes, an object being to provide a joint of simple construction for connecting pipes between cars, doing away with the usual hose-couplings and overcoming the objectionable slack and vibration of such hose-couplings.

Another object is to so construct the joint that it will be absolutely air or steam tight as to leakage.

We will describe a pipe-joint embodying our invention and then point out the novel features in the appended claims.

Reference is to be had to the accompanying drawings, forming a part of this specification, in which similar characters of reference indicate corresponding parts in all the figures.

Figure 1 is a perspective view of a pipe-joint embodying our invention. Fig. 2 is a section on the line $xx$ of Fig. 1 and on an enlarged scale. Fig. 3 is a section on the line $yy$ of Fig. 2, and Fig. 4 is a perspective view of one of the packing-rings employed.

As here shown, the joint comprises a tubular central member 1 and tubular end pieces 2, these end members being designed to be engaged with the train-pipes. The central member 1 has divergent portions 3 at its ends, terminating in chambers 4, and the end members also have divergent portions 5, terminating in chambers 6. The end members are designed to have a swinging movement relatively to the central member and at right angles thereto. To provide for this, the members are mounted on spherical or ball-like members 7, the said ball-like members having ports 8 9 extended through them, one port being at right angles to the other. Extended from each chamber into the ball member is a tubular nipple 10, which provides communication between a port of the spherical member and the chamber. Each nipple has a screw-threaded portion which engages with a thread in the spherical member, and within the chamber the nipple has a conical head 11, and mounted to move on this conical head is a packing-ring 12, consisting of sections having overlapping edges, whereby the packing-ring is made expansible to engage tightly against the conical head and also against the wall of the chamber. The end of the nipple outward of the conical portion is screw-threaded and engaged by a nut 13, which will prevent the packing-ring from being moved entirely off the conical head when there is no pressure of steam or air in the joint.

As indicated in the drawings, the central member 1 of the joint communicates, through the nipples, with the port 8, while the end members communicate with the port 9 of the spherical member. The outer end of each chamber is provided with a removable cap or plug 14. As here shown, the cap or plug has screw-thread engagement with the branches of the members. By providing these removable plugs the packing-rings 12 may be readily removed when worn out and new ones put in their place.

In the operation as the steam or air passes through the joint pressure will be exerted on the packing-rings, forcing them tightly against the walls of the chambers and also tightly upon the conical heads and the nipples, thus preventing any possible leak between the branches of the members and the spherical members.

Arranged between the branches of the members and the spherical members are washers 15, the portions of said washers engaging with the spherical members of course conforming in shape thereto.

Having thus described our invention, we claim as new and desire to secure by Letters Patent—

1. A pipe-joint, comprising a spherical member having two ports at right angles to each other, tubular members mounted to swing on the spherical member and having branches terminating in chambers, the chambers of one tubular member connecting with the opposite ends of one of said ports while the chambers of the other tubular member communicate with the ends of the other port, nipples extending from the ports into said chambers, conical heads on the ends of the nipples within the chambers, and packing-rings movable on said heads.

2. A pipe-joint, comprising a ball member having two ports through it at right angles to each other, tubular members arranged to swing on the ball member at right angles to each other, tubular members having branches terminating in chambers, nipples providing communication between the chambers of one tubular member and one of the ball-ports, nipples providing communication between the other tubular member and the other port, and expansible packing-rings movable on portions of the nipples and extended into the chambers.

3. A pipe-joint, comprising a central tubular member having branches at its ends terminating in chambers, end tubular members having branches terminating in chambers, ball members having ports extended through them at right angles to each other, nipples extended from the chambers into the ports, washers arranged between the branches of the tubular members and the ball members, and expansible packing-rings arranged in the chambers.

4. A pipe-joint, comprising tubular members having divergent branches, the said branches terminating in chambers, a ball member having ports extended through it at right angles to each other, nipples extended from the chambers into the ports of the ball member, conical heads on said nipples within the chambers, expansible packing-rings in the chambers and engaging around said heads, means for preventing dislodgment of the rings from the heads, and removable plugs forming the outer walls of the chambers.

In testimony whereof we have signed our names to this specification in the presence of two subscribing witnesses.

DANIEL P. FAHRNEY.
   GEORGE A. NEWTON.
   FRANK F. SIMMONS.

Witnesses:
 PATRICK F. LAMB,
 CHARLES E. HUNTINGTON.